US006940652B2

(12) United States Patent
Tseng

(10) Patent No.: US 6,940,652 B2
(45) Date of Patent: Sep. 6, 2005

(54) OPTICAL IMAGE RETRIEVAL METHOD

(75) Inventor: Dennis Tseng, Taipei (TW)

(73) Assignee: Pacer Technology Co., Ltd., Taipei (TW)

( * ) Notice: Subject to any disclaimer, the term of this patent is extended or adjusted under 35 U.S.C. 154(b) by 0 days.

(21) Appl. No.: 10/766,828

(22) Filed: Jan. 30, 2004

(65) Prior Publication Data

US 2005/0111104 A1 May 26, 2005

(30) Foreign Application Priority Data

Nov. 21, 2003 (TW) .............................. 92132801 A

(51) Int. Cl.[7] .......................... G02B 27/10; G09G 5/08
(52) U.S. Cl. ....................................... 359/618; 345/166
(58) Field of Search ................................ 359/618, 813, 359/814; 345/166; 369/44.14, 44.15

(56) References Cited

U.S. PATENT DOCUMENTS 5,448,649 A * 9/1995 Chen et al. ................. 382/126

* cited by examiner

*Primary Examiner*—Hung Xuan Dang
*Assistant Examiner*—Joseph Martinez
(74) *Attorney, Agent, or Firm*—Troxell Law Office, PLLC

(57) ABSTRACT

An optical image retrieval method, which makes optical input devices work on transparent media, which method generates a light and projects it in a vertical direction. The light is directed to a light-splitter and transmitted to an image contacting surface under a transparent medium. Optical image signals retrieved on the image contacting surface are reflected to the light-splitter, and then an optical axis of the image signals is reflected to a lens by the light-splitter once or more. Finally, the lens will focus the image signals onto an image detecting element.

10 Claims, 4 Drawing Sheets

OPTICAL IMAGE RETRIEVAL METHOD

BACKGROUND OF THE INVENTION

1. Field of the Invention

The present invention relates to an optical image retrieval method, and especially relates to an optical input device for retrieving correct images from a transparent medium.

2. Description of Related Arts

A prior art mouse comprises an X-axis encoder and a Y-axis encoder with output logic sequence signals (ex. 11, 10, 00, 01). The mouse is placed on a top surface or other surfaces of a desk and moved in designated directions to place a cursor on a monitor in corresponding positions. The movement of cursor on the monitor made by the mouse adopts a principle that the X-axis and the Y-axis encoders together produce control signals to move the cursor.

Reference is made to FIG. 1A and FIG. 1B, which illustrate cutaway views of prior art optical mice, respectively. When the prior art mouse is moved on a plane, a circuit control unit (not shown) will calculate the distance and direction of the movement of the mouse by the following steps:

1. Light emitted from a light-emitting element 61 is projected to a first reflection surface 621 of a transparent plate 62;
2. The light is then reflected to a second surface 622;
3. The second surface 622 reflects the light onto a contact surface 64 made of a non-transparent interface through an opening of a bottom shell 63, in which an image axis F overlaps with the contact surface 64 when the contact surface 64 is a non-transparent interface;
4. A lens 65 focuses optical image signals of the image axis F onto an image-detecting element 66; and
5. The optical image signals are transferred to the circuit control unit for processing.

An optical axis D of the projected light must be intersected at a point P of the image contacting surface 64 with an image-retrieval optical axis R and an image axis F; therefore, the image-detecting element 66 can retrieve the image on the image axis F.

If the image contacting surface 64 is made of a transparent medium such as glass, the image axis F does not overlap with the image contacting surface 64. The optical axis D of the projected light may intersect with an image axis F1 at a point M under the image contacting surface 64 (the refraction effect is not taken into account here). Meanwhile, the optical axis D and the image-retrieval optical axis R cannot intersect with the image axis F of the image contacting surface 64, as FIG. 1B shows. The optical mouse therefore doesn't work on a transparent medium.

From another point of view, prior art mice must reflect the light emitted from the light-emitting light-emitting element 61 twice to the image contacting surface 64, and this wastes power.

SUMMARY OF THE INVENTION

The object of the present invention is to provide an image retrieval method for optical mice on a transparent medium.

Another object of the present invention is to provide an optical mouse, which can save the power of a light source in the optical mouse. Because the light of the light source can be emitted to the transparent medium in a shortest route, the power of the light source can be saved.

To achieve the above objects, the present invention provides an image retrieval method for optical mice on a transparent medium, and the steps of the method are:

1. Generating a light and projecting it in a vertical direction;
2. Directing the light to a light-splitter;
3. Splitting the light by the light-splitter and directing the split light to an image contacting surface under a transparent medium;
4. Reflecting the image signals retrieved on the image contacting surface to the light-splitter, and an image retrieval optical axis overlaps with the optical axis of the split light; and
5. Reflecting the light returned from the image contacting surface to a lens once or more by the light-splitter; the lens will focus the light to an image detecting element.

The method further provides:

1. Generating a light and projecting it in a vertical direction;
2. Reflecting the light to the image contacting surface once or more by the light-splitter;
3. Reflecting the light to an image contacting surface under a transparent medium once or more by the light-splitter;
4. Reflecting the image signals retrieved on the image contacting surface to the light-splitter, and an image retrieval optical axis overlaps with the optical axis of the reflected light; and
5. Transmitting the image optical axis to a lens; the lens will focus the light of images signals to an image detecting element.

The above-mentioned transparent medium may be glass.

BRIEF DESCRIPTION OF THE DRAWINGS

The various objects and advantages of the present invention will be more readily understood from the following detailed description when read in conjunction with the appended drawing, in which.

DETAILED DESCRIPTION OF PREFERRED EMBODIMENTS

Figure 1A:
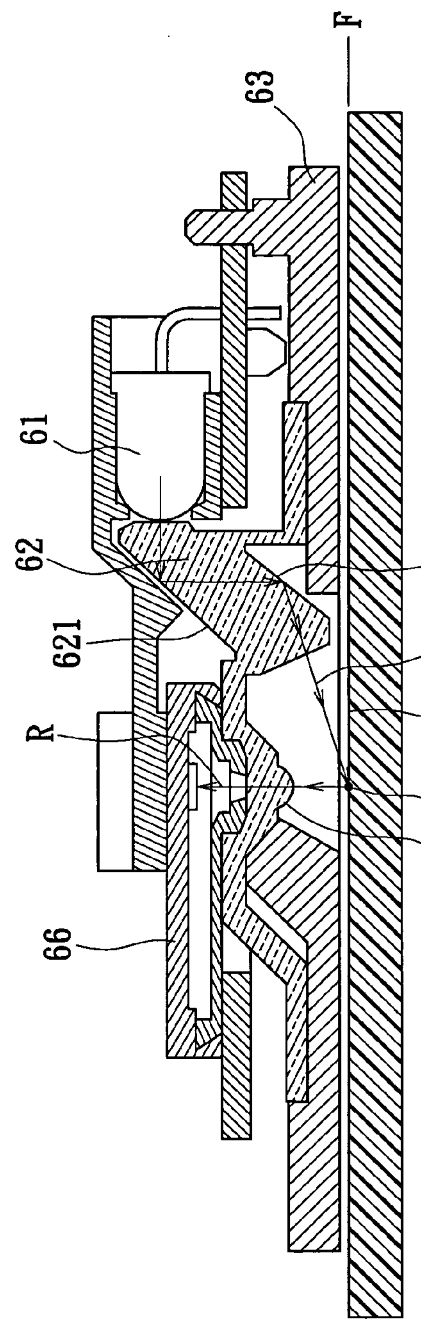
FIG. 1A shows a cross-sectional view of a prior art optical mouse.
Figure 1B:
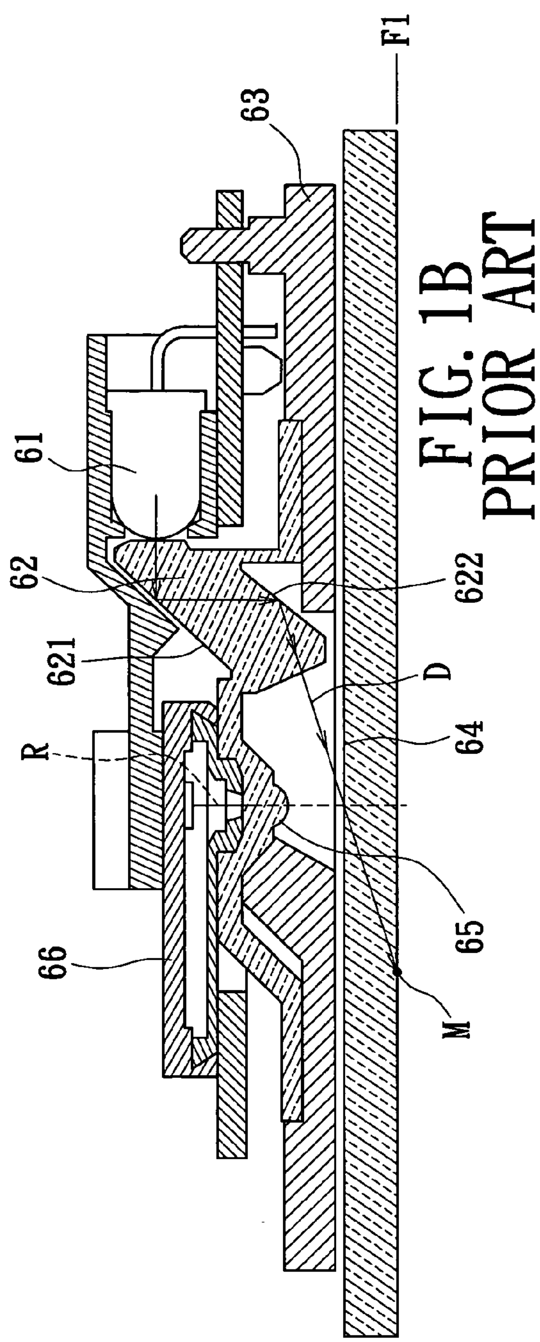
FIG. 1B shows a cross-sectional view of the prior art optical mouse.
Figure 2:
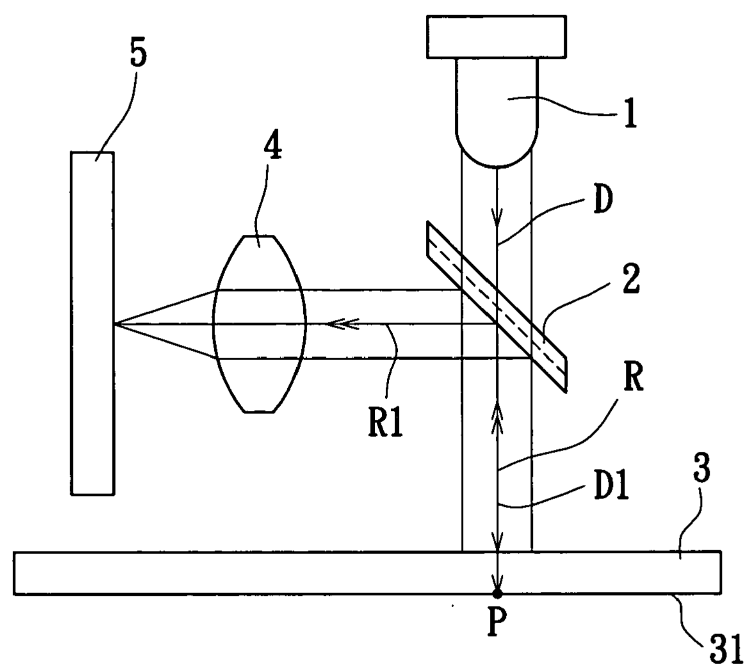
FIG. 2 shows a schematic view of a first embodiment according to the present invention.

Reference is made to FIG. 2, which shows a first embodiment according to the present invention. The embodiment shows an optical image signals retrieval method, and it provides following steps:

1. Generating a light by a light-emitting element 1, the light propagating along a vertical optical axis D, where the light-emitting element 1 is a light-emitting diode;

2. Directing the light with the optical axis D to a surface of a beam splitter 2, where the incident light will be split into a reflected light and a transmitted light by the beam splitter 2;
3. Directing the transmitted light with an optical axis D1 to an image contacting surface 31 under a transparent medium for producing an optical image signal, where the transparent medium is, for example, glass;
4. Reflecting the optical image signals from the image contacting surface 31 to an internal surface of the beam splitter 2 along an image retrieval optical axis R, where the image retrieval optical axis R overlaps with the optical axis D1 of the transmitted light;
5. Reflecting the optical image signal with the beam splitter 2 to redirect it along an image optical axis R1 to a lens 4. The lens 4 will focus the light of image signals onto an image detecting element 5 (CCD or CIS); because the optical axis D1 and the image retrieval optical axis R overlap and intersect with a point P of the image contacting surface 31, images can be correctly retrieved by the image detecting element 5.

Therefore, optical devices may operate normally on transparent media and the image detecting element 5 can retrieve the images reflected from the transparent media 3. Further, movement and directions made by the optical mouse are calculated by control units.

Figure 3:
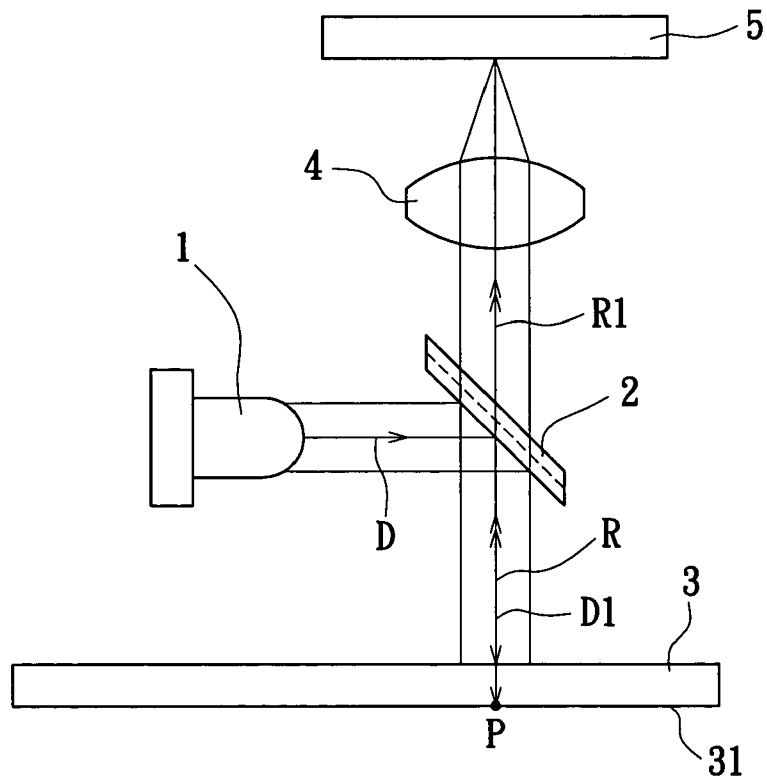
FIG. 3 shows a schematic view of a second embodiment according to the present invention.

Reference is made to FIG. 3, which shows a second embodiment according to the present invention. The embodiment shows an optical image signals retrieval method, and it provides following steps:

1. Generating a light by a light-emitting element 1, the light propagating along an optical axis D in a horizontal direction, where the light-emitting element 1 is a light-emitting diode;
2. Directing the light with the optical axis D to a surface of a beam splitter 2, where the incident light will be split into a reflected light and a transmitted light by the beam splitter 2;
3. Directing the transmitted light with an optical axis D1 to an image contacting surface 31 under a transparent medium for producing an optical image signal, where the transparent medium is, for example, glass;
4. Reflecting the optical image signals from the image contacting surface 31 to an internal surface of the beam splitter 2 along an image retrieval optical axis R, where the image retrieval optical axis R overlaps with the optical axis D1 of the transmitted light;
5. Transmitting an image optical with the beam splitter 2 to redirect it along the axis R1 to a lens 4. The lens 4 will focus the light of optical image signals to an image detecting element 5 (CCD or CIS); because the optical axis D1 and the image retrieval optical axis R overlap and intersect with a point P of the image contacting surface 31, images can be correctly retrieved by the image detecting element 5.

Therefore, optical devices may operate normally on transparent media 3 and the image detecting element 5 can retrieve the images reflected from the transparent media 3. Further, movement and directions made by the optical mouse is calculated by control units.

Figure 4:
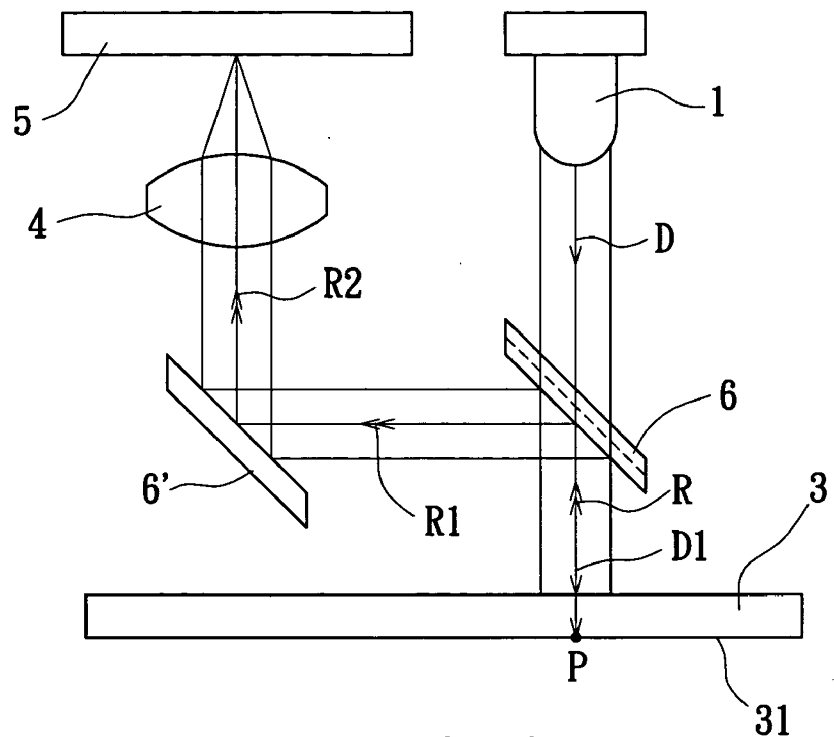
FIG. 4 shows a schematic view of a third embodiment according to the present invention.

The present invention further provides an optical image signals retrieval method using a beam splitter and a reflecting mirror. Reference is made to FIG. 4, which shows a third embodiment according to the present invention. The embodiment shows an optical image signals retrieval method, and it provides following steps:

1. Generating a light by a light-emitting element 1, the light propagating along an optical axis D in a vertical direction, where the light-emitting element 1 is a light-emitting diode;
2. Directing the light with the optical axis D to a surface of a beam splitter 6, where the incident light will be split into a reflected light and a transmitted light by the beam splitter 6;
3. Directing the transmitted light along an optical axis D1 to an image contacting surface 31 under a transparent medium, where the transparent medium is, for example, glass;
4. Reflecting optical image signals from the image contacting surface 31 to the beam splitter 6 along the an image retrieval optical axis R, where the retrieval optical axis R overlaps with the optical axis D1 of the reflected light;
5. Reflecting the light with the beam splitter along an image optical axis R1 to a surface of a reflecting mirror 6';
6. Reflecting the light by the reflecting mirror 6' along an image optical axis R2 to a lens 4. The lens 4 will focus the light of image signals to an image detecting element 5; because the optical axis D1 and the image retrieval optical axis R overlap and intersect with a point P of the image contacting surface 31, images can be correctly retrieved by the image detecting element 5.

Therefore, optical devices may operate normally on the transparent media 3 and the image detecting element 5 can retrieve the images reflected from the transparent media 3. Further, movement and directions made by the optical mouse are calculated by control units.

Figure 5:
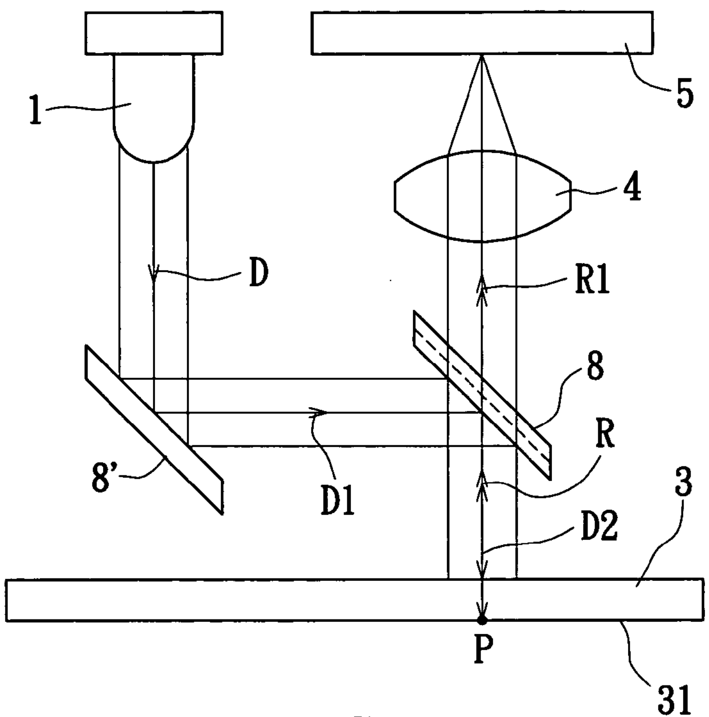
FIG. 5 shows a schematic view of a fourth embodiment according to the present invention.

Reference is made to FIG. 5, which shows a fourth embodiment according to the present invention. The embodiment shows an optical image signals retrieval method, and it provides following steps:

1. Generating a light by a light-emitting element 1 and the light propagating along an optical axis D in a vertical direction, where the light-emitting element 1 is a light-emitting diode;
2. Directing the light with the optical axis D to a surface of a reflection mirror 8';
3. Directing the light reflected from the reflection mirror 8' with an optical axis D1 to a beam splitter 8, where the incident light will be split into a reflected light and a transmitted light by the beam splitter 8;
4. Directing the reflected light along an optical axis D2 to an image contacting surface 31 under a transparent medium 3, where the transparent medium 3 may be glass;
5. Reflecting optical image signals from the image contacting surface 31 to the beam splitter 8. An image retrieval optical axis R overlaps with the optical axis D2 of the reflected light;
6. Transmitting the light by the beam splitter 8 with an image optical axis R1 to a lens 4. The lens 4 will focus the light of image signals to an image detecting element 5; because the optical axis D2 and the image retrieval optical axis R overlap and intersect with a point P of the image contacting surface 31, images can be retrieved by the image detecting element 5.

Therefore, optical devices may operate normally on the transparent media 3 and the image detecting element 5 can retrieve the images reflected from the transparent media 3. Besides, movement and directions made by the optical mouse are calculated by control units.

The present invention can combine a beam splitter and a reflecting mirror into one single element for providing an optical image signals retrieval method.

Figure 6:
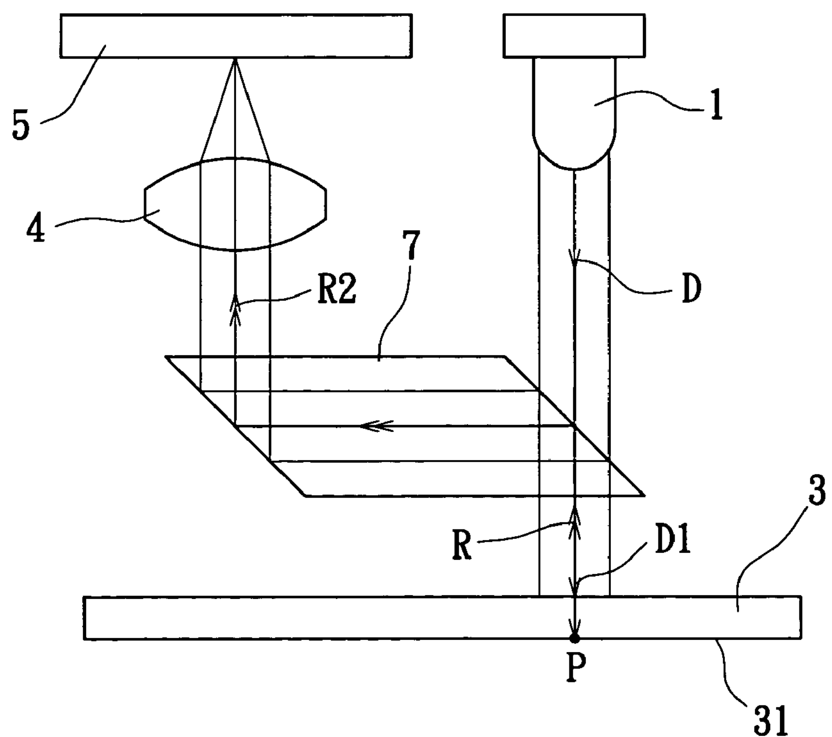
FIG. 6 shows a schematic view of a fifth embodiment according to the present invention.

Reference is made to FIG. 6, which shows a fifth embodiment according to the present invention. The embodiment shows an optical image signals retrieval method, and it provides following steps:

1. Generating a light by a light-emitting element 1 and an optical axis D of the light is projected in a vertical direction, where the light-emitting element 1 is a light-emitting diode;
2. Directing the light with the optical axis D to a lens unit 7;
3. Directing the light transmitted by the lens unit 7 with an optical axis D1 to an image contacting surface 31 under a transparent medium 3. The transparent medium 3 is, for example, glass;
4. Reflecting optical image signals from the image contacting surface 31 to the lens unit 7. An image retrieval optical axis R overlaps with the optical axis D1 of the transmitted light;
5. Directing the light reflected twice by the lens 7 with an image optical axis R2 to a lens 4. The lens 4 will focus the light of image signals to an image detecting element 5 (CCD or CIS); because the optical axis D1 and the image retrieval optical axis R overlap and intersect with a point P of the image contacting surface 31, images can be retrieved correctly by the image detecting element 5.

Therefore, optical devices may operate normally on the transparent media 3 and the image detecting element 5 can retrieve the images reflected from the transparent medium 3. Besides, movement and directions made by the optical mouse are calculated by control units.

Figure 7:
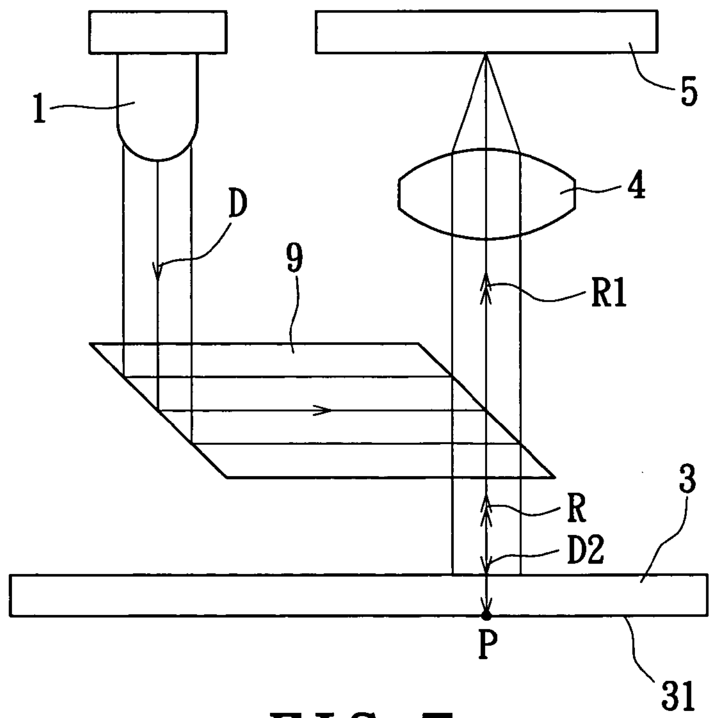
FIG. 7 shows a schematic view of a sixth embodiment according to the present invention.

Reference is made to FIG. 7, which shows a sixth embodiment according to the present invention. The embodiment shows an optical image signals retrieval method, and it provides following steps:

1. Generating a light by a light-emitting element 1 and the light propagating along an optical axis D in a vertical direction, where the light-emitting element 1 is a light-emitting diode;
2. Directing the light with the optical axis D to a lens unit 9 for reflecting twice;
3. Directing the light reflected twice with an optical axis D2 to an image contacting surface 31 under a transparent medium 3, where the transparent medium 3 is, for example, glass;
4. Reflecting optical image signals from the image contacting surface 31 to the lens unit 9. An image retrieval optical axis R overlaps with the optical axis D2 of the transmitted light;
5. Transmitting the light with an image optical axis R1 to a lens 4. The lens 4 will focus the light of image signals to an image detecting element 5 (CCD or CIS); because the optical axis D2 and the image retrieval optical axis R overlap and intersect with a point P of the image contacting surface 31, images can be retrieved by the image detecting element 5.

Therefore, optical devices may operate normally on the transparent media 3 and the image detecting element 5 can retrieve the images reflected from the transparent media 3. Additionally, movement and directions made by the optical mouse are calculated by control units.

Furthermore, media of the above-mentioned image contacting surface 31, such as, for example, paper, plated object, printing images, and carvings, can be set between two transparent elements, such as, for example, glass.

Additionally, an optical device can operate on transparent media and also on non-transparent media.

Although the present invention has been described with reference to the preferred embodiment therefore, it will be understood that the invention is not limited to the details thereof. Various substitutions and modifications have suggested in the foregoing description, and other will occur to those of ordinary skill in the art. Therefore, all such substitutions and modifications are intended to be embrace within the scope of the invention as defined in the appended claims.

What is claimed is:

1. An optical image retrieval method for detecting an optical image signal reflected from an image contacting surface under a transparent medium, the method comprising steps as follows:

generating a light projected in a vertical direction;

directing the light to an optical device;

transmitting the light through the optical device and directing a transmitted light passing through the optical device to the image contacting surface under the transparent medium for producing the optical image signal;

reflecting the optical image signal to the optical device along an image retrieval optical axis, wherein the image retrieval optical axis overlaps with an optical axis of the transmitted light; and reflecting the optical image signals returned from the image contacting surface to a lens once or more with the optical device, the lens focusing the optical image signals to an image detecting element.

2. The optical image retrieval method as in claim 1, wherein the transparent medium is glass.

3. The optical image retrieval method as in claim 1, wherein images are also retrieved on a non-transparent medium.

4. An optical image retrieval method, providing:

generating a light and projecting the light in a vertical direction;

directing the light to an optical device;

directing the light reflected by the optical device at least once to an image contacting surface under a transparent medium;

reflecting optical image signals to the optical device, wherein an image retrieval optical axis overlaps with an optical axis of light reflected by the optical device; and transmitting the optical image signals returned from the image contacting surface to a lens by the optical device, wherein the lens focuses the optical image signals onto an image detecting element, wherein images are also retrieved on a non-transparent medium.

5. The optical image retrieval method as in claim 4, wherein the transparent medium is glass.

6. An optical image retrieval method, providing:

generating a light and projecting the light in a horizontal direction;

directing the light to an optical device;

directing light reflected by the optical device to an image contacting surface under a transparent medium;

reflecting optical image signals onto the optical device, wherein an image retrieval optical axis overlaps with an optical axis of light reflected by the optical device;

transmitting optical image signals returned from the image contacting surface to a lens by the optical device, wherein the lens will focus the optical image signals onto an image detecting element, wherein images are also retrieved on a non-transparent medium.

7. The optical image retrieval method as in claim 6, wherein the transparent medium is glass.

8. An optical image retrieval method, providing:

generating a light and projecting the light in a horizontal direction;

directing the light to a lens unit;

directing the light reflected by the lens unit twice to an image contacting surface under a transparent medium;

reflecting optical image signals to the lens unit, wherein an image retrieval optical axis overlaps with the optical axis of the light reflected twice by the lens unit;

transmitting light returned from the image contacting surface to a lens by the lens unit, wherein the lens focuses the light onto an image detecting element.

9. The optical image retrieval method as in claim 8, wherein the transparent medium is glass.

10. The optical image retrieval method as in claim 8, wherein images are also retrieved on a non-transparent medium.

* * * * *